United States Patent
Kumar et al.

(10) Patent No.: US 10,804,983 B2
(45) Date of Patent: Oct. 13, 2020

(54) TUNING A SUBSET OF RECEIVE CHAINS OF A COMPONENT CARRIER AWAY FROM MIMO COMMUNICATION TO PERFORM AN INTER-FREQUENCY POSITIONING REFERENCE SIGNAL MEASUREMENT

(71) Applicant: QUALCOMM Incorporated, San Diego, CA (US)

(72) Inventors: Akash Kumar, Hyderabad (IN); Amit Jain, San Diego, CA (US); Ankita, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/712,752

(22) Filed: Sep. 22, 2017

(65) Prior Publication Data

US 2019/0097696 A1   Mar. 28, 2019

(51) Int. Cl.
*H04B 7/0456* (2017.01)
*G01S 1/20* (2006.01)
(Continued)

(52) U.S. Cl.
CPC ........... *H04B 7/0456* (2013.01); *G01S 1/20* (2013.01); *G01S 5/0221* (2013.01); *G01S 5/10* (2013.01);
(Continued)

(58) Field of Classification Search
CPC .... H04B 7/0456; H04B 7/066; H04B 7/0632; H04B 17/336; H04L 1/0029; H04L 1/0026; H04L 5/0023; H04L 5/0098
See application file for complete search history.

(56) References Cited

U.S. PATENT DOCUMENTS 8,644,262 B1   2/2014  Sun et al.
10,098,088 B1  10/2018 Kumar et al.
(Continued)

FOREIGN PATENT DOCUMENTS

WO       2015190956 A1   12/2015
WO   WO-2016153286 A1    9/2016
WO   WO-2017013113 A1    1/2017

OTHER PUBLICATIONS

Fischer S., "Observed Time Difference of Arrival (OTDOA) Positioning in 3GPP LTE", Jun. 6, 2014 (Jun. 6, 2014), 62 Pages, XP055284784, Retrieved from the Internet: URL: http://www.terranautx.com/s/Qualcomm-OTDOA-positioning-in-LTE-June-2014.pdf.
International Search Report and Written Opinion—PCT/US2018/051871—ISA/EPO—dated Dec. 12, 2018.

*Primary Examiner* — Sam K Ahn
*Assistant Examiner* — Amneet Singh
(74) *Attorney, Agent, or Firm* — MG-IP Law, P.C.

(57) ABSTRACT

Embodiments are directed to a user equipment (UE) that performs MIMO communication on a plurality of Component Carriers (CCs) in accordance with a Carrier Aggregation (CA) scheme with each CC having an associated rank number that indicates a respective number of receive chains for the CC, selects at least one of the plurality of CCs for tuning away from the MIMO communication in order to perform an inter-frequency (IF) Positioning Reference Signal (PRS) measurement, selects, from among a plurality of receive chains allocated to the selected at least one CC, a subset of receive chains that includes less than all of the plurality of receive chains to be tuned away from the MIMO communication to perform the inter-frequency PRS measurement, and tunes the selected subset of receive chains of the selected at least one CC away from the MIMO communication to perform the inter-frequency PRS measurement.

24 Claims, 8 Drawing Sheets

(51) Int. Cl.
  *H04W 64/00*    (2009.01)
  *H04B 7/06*     (2006.01)
  *H04B 7/0413*   (2017.01)
  *H04L 5/00*     (2006.01)
  *H04B 7/08*     (2006.01)
  *G01S 5/10*     (2006.01)
  *G01S 5/02*     (2010.01)
  *H04B 17/336*   (2015.01)
  *H04W 24/10*    (2009.01)
  *H04L 1/00*     (2006.01)

(52) U.S. Cl.
  CPC ........... *H04B 7/0413* (2013.01); *H04B 7/066* (2013.01); *H04B 7/0632* (2013.01); *H04B 7/0689* (2013.01); *H04B 7/0817* (2013.01); *H04B 7/0891* (2013.01); *H04B 17/336* (2015.01); *H04L 5/001* (2013.01); *H04L 5/0048* (2013.01); *H04W 64/00* (2013.01); *H04L 1/0026* (2013.01); *H04L 1/0029* (2013.01); *H04L 5/0023* (2013.01); *H04W 24/10* (2013.01); *H04W 64/003* (2013.01)

(56) References Cited

U.S. PATENT DOCUMENTS

| | | |
|---|---|---|
| 2011/0261675 A1 | 10/2011 | Lee et al. |
| 2012/0263054 A1 | 10/2012 | Kazmi et al. |
| 2012/0307670 A1* | 12/2012 | Kazmi .................. H04W 24/10 370/252 |
| 2013/0059610 A1 | 3/2013 | Siomina et al. |
| 2013/0288624 A1 | 10/2013 | Mujtaba et al. |
| 2014/0146697 A1 | 5/2014 | Kim et al. |
| 2015/0016556 A1 | 1/2015 | Chen et al. |
| 2015/0092708 A1 | 4/2015 | Su et al. |
| 2015/0215793 A1* | 7/2015 | Siomina ................ G01S 5/0205 455/456.1 |
| 2015/0230112 A1 | 8/2015 | Siomina et al. |
| 2016/0127055 A1 | 5/2016 | Dayal et al. |
| 2017/0195029 A1 | 7/2017 | Nammi et al. |
| 2018/0019857 A1 | 1/2018 | Kazmi et al. |
| 2018/0084448 A1 | 3/2018 | Yang et al. |
| 2019/0097740 A1 | 3/2019 | Kumar et al. |

\* cited by examiner

TUNING A SUBSET OF RECEIVE CHAINS OF A COMPONENT CARRIER AWAY FROM MIMO COMMUNICATION TO PERFORM AN INTER-FREQUENCY POSITIONING REFERENCE SIGNAL MEASUREMENT

CROSS-REFERENCE TO RELATED APPLICATIONS

This application contains subject matter which is related to the subject matter of U.S. patent application Ser. No. 15/712,776, entitled "SELECTING A COMPONENT CARRIER TO BE TUNED AWAY FROM MIMO COMMUNICATION TO PERFORM AN INTER-FREQUENCY POSITIONING REFERENCE SIGNAL MEASUREMENT", which is assigned to the same assignee as the subject application and filed on the same day as the subject application.

BACKGROUND

1. Field of the Disclosure

Embodiments relate to tuning a subset of receive chains of a component carrier away from multiple-input multiple-output (MIMO) communication to perform an inter-frequency positioning reference signal (PRS) measurement.

2. Description of the Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, 3rd Generation Partnership Project (3GPP) Long Term Evolution (LTE) systems, and Orthogonal Frequency Division Multiple Access (OFDMA) systems.

Generally, a wireless multiple-access communication system can simultaneously support communication for multiple user equipments (UEs). Each UE communicates with one or more base stations via transmissions on the forward and reverse links. The forward link (or downlink) refers to the communication link from the base stations to the UEs, and the reverse link (or uplink) refers to the communication link from the UEs to the base stations. This communication link may be established via a single-input single-output, multiple-input single-output or a multiple-input multiple-output (MIMO) system.

A MIMO system (e.g., LTE-Advanced or LTE MIMO) employs multiple transmit antennas and multiple receive antennas for data transmission. MIMO systems, such as LTE MIMO, may use carrier aggregation that allows a number of carriers to be combined or aggregated. Each aggregated carrier is referred to as a component carrier (CC). A primary CC (PCC) is established between a UE and a primary serving cell, and one or more secondary CCs (SCCs) may be established between the UE and a secondary serving cell. In an example, the SCCs may be added and removed as required, while the PCC is changed upon handover to a new primary serving cell. Each CC comprises a set of transmit carriers (or chains) and a set of receive carriers (or chains). The respective chains of each CC are implemented in accordance with either a spatial multiplexing scheme (e.g., different data is received or transmitted on each respective chain to improve bandwidth) or a spatial diversity scheme (e.g., the same data is redundantly received or transmitted on each respective chain to improve reliability).

SUMMARY

An embodiment is directed to a method of operating a user equipment (UE), including performing multiple-input multiple-output (MIMO) communication on a plurality of Component Carriers (CCs) in accordance with a Carrier Aggregation (CA) scheme with each CC having an associated rank number that indicates a respective number of receive chains for the CC, selecting at least one of the plurality of CCs for tuning away from the MIMO communication in order to perform an inter-frequency Positioning Reference Signal (PRS) measurement, selecting, from among a plurality of receive chains allocated to the selected at least one CC, a subset of receive chains that includes less than all of the plurality of receive chains to be tuned away from the MIMO communication to perform the inter-frequency PRS measurement, and tuning the selected subset of receive chains of the selected at least one CC away from the MIMO communication to perform the inter-frequency PRS measurement.

Another embodiment is directed to a UE, including means for performing MIMO communication on a plurality of CCs in accordance with a CA scheme with each CC having an associated rank number that indicates a respective number of receive chains for the CC, means for selecting at least one of the plurality of CCs for tuning away from the MIMO communication in order to perform an inter-frequency PRS measurement, means for selecting, from among a plurality of receive chains allocated to the selected at least one CC, a subset of receive chains that includes less than all of the plurality of receive chains to be tuned away from the MIMO communication to perform the inter-frequency PRS measurement, and means for tuning the selected subset of receive chains of the selected at least one CC away from the MIMO communication to perform the inter-frequency PRS measurement.

Another embodiment is directed to a UE, including at least one processor coupled to a transceiver and configured to perform MIMO communication on a plurality of CCs in accordance with a CA scheme with each CC having an associated rank number that indicates a respective number of receive chains for the CC, select at least one of the plurality of CCs for tuning away from the MIMO communication in order to perform an inter-frequency PRS measurement, selecting, from among a plurality of receive chains allocated to the selected at least one CC, a subset of receive chains that includes less than all of the plurality of receive chains to be tuned away from the MIMO communication to perform the inter-frequency PRS measurement, and tune the selected subset of receive chains of the selected at least one CC away from the MIMO communication to perform the inter-frequency PRS measurement.

Another embodiment is directed to a non-transitory computer-readable medium containing instructions stored thereon, which, when executed by a UE instruct the UE to perform operations, the instructions including at least one instruction configured to cause the UE to perform MIMO communication on a plurality of CCs in accordance with a CA scheme with each CC having an associated rank number that indicates a respective number of receive chains for the CC, at least one instruction configured to cause the UE to select at least one of the plurality of CCs for tuning away from the MIMO communication in order to perform an inter-frequency PRS measurement, at least one instruction configured to cause the UE to select, from among a plurality of receive chains allocated to the selected at least one CC, a subset of receive chains that includes less than all of the plurality of receive chains to be tuned away from the MIMO communication to perform the inter-frequency PRS measurement, and at least one instruction configured to cause the UE to tune the selected subset of receive chains of the selected at least one CC away from the MIMO communication to perform the inter-frequency PRS measurement.

BRIEF DESCRIPTION OF THE DRAWINGS

A more complete appreciation of embodiments of the disclosure will be readily obtained as the same becomes better understood by reference to the following detailed description when considered in connection with the accompanying drawings which are presented solely for illustration and not limitation of the disclosure, and in which.

DETAILED DESCRIPTION

Figure 1:
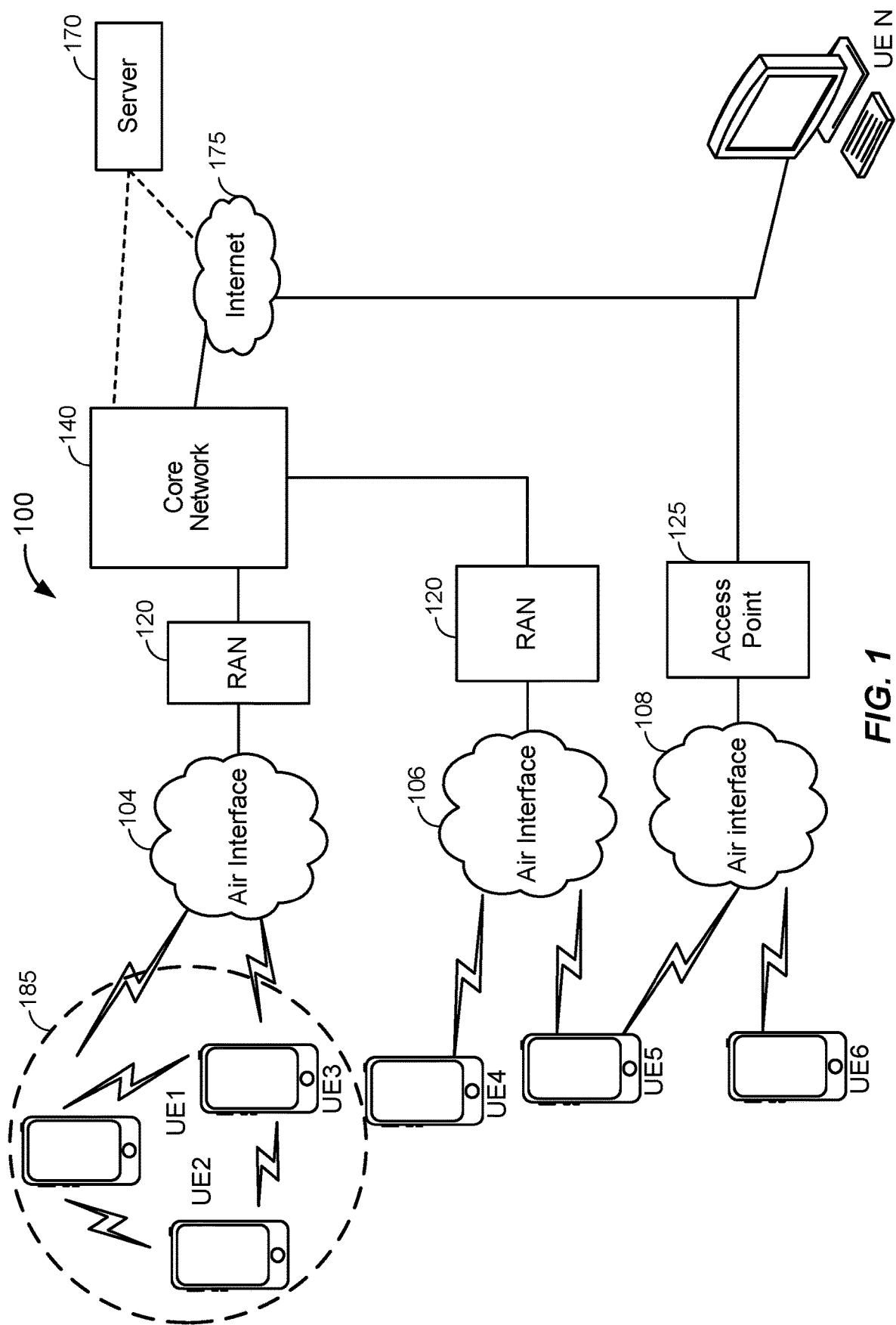
FIG. 1 illustrates a high-level system architecture of a wireless communications system in accordance with an embodiment of the disclosure.

Embodiments of the disclosure are directed to tuning a subset of receive chains (e.g., less than all receive chains) of a component carrier away from multiple-input multiple-output (MIMO) communication to perform an inter-frequency positioning reference signal (PRS) measurement.

Aspects of the disclosure are disclosed in the following description and related drawings directed to specific embodiments of the disclosure. Alternate embodiments may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the disclosure" does not require that all embodiments of the disclosure include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter.

A client device, referred to herein as a UE, may be mobile or stationary, and may communicate with a wired access network and/or a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile device", a "mobile terminal", a "mobile station" and variations thereof. In an embodiment, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on Institute of Electrical and Electronics Engineers (IEEE) 802.11, etc.) and so on. UEs can be embodied by any of a number of types of devices including but not limited to cellular telephones, personal digital assistants (PDAs), pagers, laptop computers, desktop computers, printed circuit (PC) cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). A communication link through which UEs can send signals to other UEs is called a peer-to-peer (P2P) or device-to-device (D2D) channel.

FIG. 1 illustrates a high-level system architecture of a wireless communications system 100 in accordance with an embodiment of the disclosure. The wireless communications system 100 contains UEs 1 . . . N. For example, in FIG. 1, UEs 1 . . . 2 are illustrated as cellular calling phones, UEs 1 . . . 6 are illustrated as cellular touchscreen phones or smart phones, and UE N is illustrated as a desktop computer or personal computer.

Referring to FIG. 1, UEs 1 . . . N are configured to communicate with an access network (e.g., a RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, 4G LTE, 5G LTE, etc.), while the air interface 108 can comply with a wireless protocol (e.g., IEEE 802.11). The RAN 120 may include a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 may be configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175.

The Internet 175, in some examples, includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UEs 1 . . . N via the core network 140. Also shown in FIG. 1 is the access point 125 that is separate from the RAN 120. The access point 125 may be connected to the Internet 175 independent of the core network 140 (e.g., via an optical communications system such as FiOS, a cable modem, etc.). The air interface 108 may serve UE 5 or UE 6 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, a server 170 is shown as connected to the Internet 175, the core network 140, or both. The server 170 can be implemented as a plurality of structurally separate servers, or alternately may correspond to a single server. The server 170 may correspond to any type of server, such as a web server (e.g., hosting a web page), an application download server, or an application server that supports particular communicative service(s), such as Voice-over-Internet Protocol (VoIP) sessions, Push-to-Talk (PTT) sessions, group communication sessions, a social networking service, etc.

Referring to FIG. 1, UEs 1 . . . 3 are depicted as part of a D2D network or D2D group 185, with UEs 1 and 3 being connected to the RAN 120 via the air interface 104. In an embodiment, UE 2 may also gain indirect access to the RAN 120 via mediation by UEs 1 and/or 3, whereby data 'hops' to/from UE 2 and one (or more) of UEs 1 and 3, which communicate with the RAN 120 on behalf of UE 2. The D2D group 185 may be supported via one or more WPAN RATs, in an example.

Figure 2:
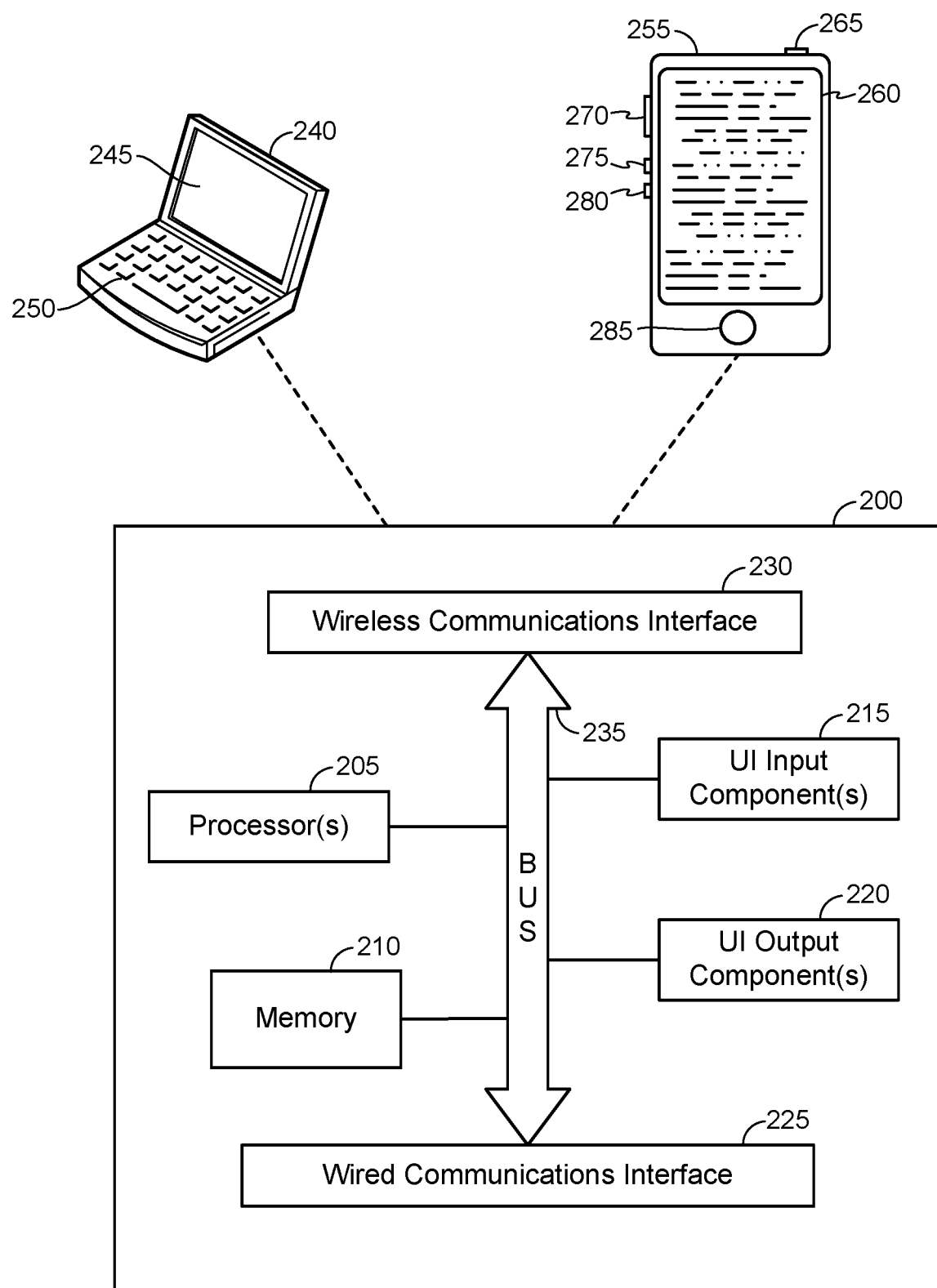
FIG. 2 illustrates a user equipment (UE) in accordance with an embodiment of the disclosure.

FIG. 2 illustrates a UE 200 in accordance with an embodiment of the disclosure. The UE 200 includes one or more processors 205 (e.g., one or more ASICs, one or more digital signal processors (DSPs), etc.) and a memory 210 (e.g., random access memory (RAM), read-only memory (ROM), electrically erasable programmable ROM (EEPROM), flash cards, or any memory common to computer platforms). The memory 210 may include content (e.g., media files that can be accessed via a media gallery application), as well as various applications (e.g., a media gallery application, a facial recognition module, a media capture or camera application, one or more messenger or call applications, a web browser, a navigation or mapping application, etc.) that are executable by the one or more processors 205 via an associated operating system. The UE 200 also includes one or more user interface (UI) input components 215 (e.g., a keyboard and mouse, a touchscreen, a microphone, one or more buttons such as volume or power buttons, etc.) and one or more UI output components 220 (e.g., speakers, a display screen, a vibration device for vibrating the UE 200, etc.).

The UE 200 further includes a wired communications interface 225 and a wireless communications interface 230. In an example embodiment, the wired communications interface 225 can be used to support wired local connections to peripheral devices (e.g., a universal serial bus (USB) connection, a mini USB, Firewire or lightning connection, a headphone jack, graphics ports such as serial, video graphics array (VGA), high-definition multimedia interface (HDMI), digital visual interface (DVI) or DisplayPort, audio ports, and so on) and/or to a wired access network (e.g., via an Ethernet cable or another type of cable that can function as a bridge to the wired access network such as HDMI v1.4 or higher, etc.). In another example embodiment, the wireless communications interface 230 includes one or more wireless transceivers for communication in accordance with a local wireless communications protocol (e.g., wireless local area network (WLAN) or WiFi, WiFi Direct, one or more wireless personal area network (WPAN) radio access technologies (RATs), LTE Direct (LTE-D), Miracast, etc.). The wireless communications interface 230 may also include one or more wireless transceivers for communication with a cellular RAN (e.g., via CDMA, W-CDMA, time division multiple access (TDMA), frequency division multiple access (FDMA), Orthogonal Frequency Division Multiplexing (OFDM), GSM, or other protocols that may be used in a wireless communications network or a data communications network). The various components 205-230 of the UE 200 can communicate with each other via a bus 235. In one implementation, the processors 205 can be coupled, for example via bus 235, to one or more transceivers of the wireless communications interface 230 and be configured to perform the functionality of blocks 400, 405, 410, and 415 of FIG. 4 and/or perform the functionality of blocks 600, 605, 610, and 615 of FIG. 6.

Referring to FIG. 2, the UE 200 may correspond to any type of UE, including but not limited to a smart phone, a laptop computer, a desktop computer, a tablet computer, a wearable device (e.g., a pedometer, a smart watch, etc.) and so on. Two particular implementation examples of the UE 200 are depicted in FIG. 2, which are illustrated as laptop 240 and touchscreen device 255 (e.g., a smart phone, a tablet computer, etc.). The laptop 240 includes a display screen 245 and a UI area 250 (e.g., keyboard, touchpad, power button, etc.), and while not shown the laptop 240 may include various ports as well as wired and/or wireless transceivers (e.g., Ethernet card, WiFi card, broadband card, satellite position system (SPS) antennas such as global positioning system (GPS) antennas, etc.).

The touchscreen device 255 is configured with a touchscreen display 260, peripheral buttons 265, 270, 275 and 280 (e.g., a power button, a volume or vibrate control button, an airplane mode toggle button, etc.), and at least one front-panel button 285 (e.g., a Home button, etc.), among other components, as is known in the art. While not shown explicitly as part of the touchscreen device 255, the touchscreen device 255 can include one or more external antennas and/or one or more integrated antennas that are built into the external casing of the touchscreen device 255, including but not limited to WiFi antennas, cellular antennas, SPS antennas (e.g., GPS antennas), and so on.

A MIMO system (e.g., LTE-Advanced or LTE MIMO) employs multiple transmit antennas and multiple receive antennas for data transmission. MIMO systems, such as LTE MIMO, may use carrier aggregation that allows a number of carriers to be combined or aggregated. Each aggregated carrier is referred to as a component carrier (CC). A primary CC (PCC) is established between a UE and a primary serving cell, and one or more secondary CCs (SCCs) may be established between the UE and a secondary serving cell. In an example, the SCCs may be added and removed as required, while the PCC is changed upon handover to a new primary serving cell. Each CC comprises a set of transmit carriers (or chains) and a set of receive carriers (or chains). The respective chains of each CC may be implemented in accordance with either a spatial multiplexing scheme (e.g., different data is received or transmitted on each respective chain to improve bandwidth) or a spatial diversity scheme (e.g., the same data is redundantly receive or transmitted on each respective chain to improve reliability).

Observed Time Difference of Arrival (OTDOA) is a downlink positioning methodology introduced in LTE Rel. 9. OTDOA is a multilateration methodology in which a UE measures the time of arrival (TOA) of signals received from multiple base stations (or eNodeBs). The TOAs of cell-specific reference signals from several neighboring base stations (e.g., eNodeBs) are subtracted from a TOA of a positioning reference signal (PRS) of a reference base station (e.g., eNodeB) to form OTDOAs. In an example, PRSs may be periodically transmitted by base stations (e.g., during positioning occasions that occur at a certain periodicity or interval) and may be implemented as pseudo-random Quadrature Phase Shift Keying (QPSK) sequences that are mapped in diagonal patterns with shifts in frequency and time to avoid collision with cell-specific reference signals. Geometrically, each time (or range) difference determines a hyperbola, and the point at which these hyperbolas intersect is the estimated UE location.

For an intra-frequency PRS measurement, a UE can use one or more receive chains of a respective CC (e.g., PCC or SCC) to measure the PRS without causing any measurement gaps (MGs) because the PRS can be measured without tuning these receive chain(s) away from an operational frequency for the PRS. However, for an inter-frequency PRS, the UE must tune away one or more receive chains to the frequency of the PRS, which causes a measurement gap due to these receive chain(s) not being able to monitor downlink communications on an operational frequency while tuned away for the PRS measurement. Conventionally, the manner in which the UE selects the receive chain(s) to be tuned away from their respective CC's operational frequency in order to perform a PRS measurement is based upon throughput (TP), as discussed below with respect to FIG. 3.

Figure 3:
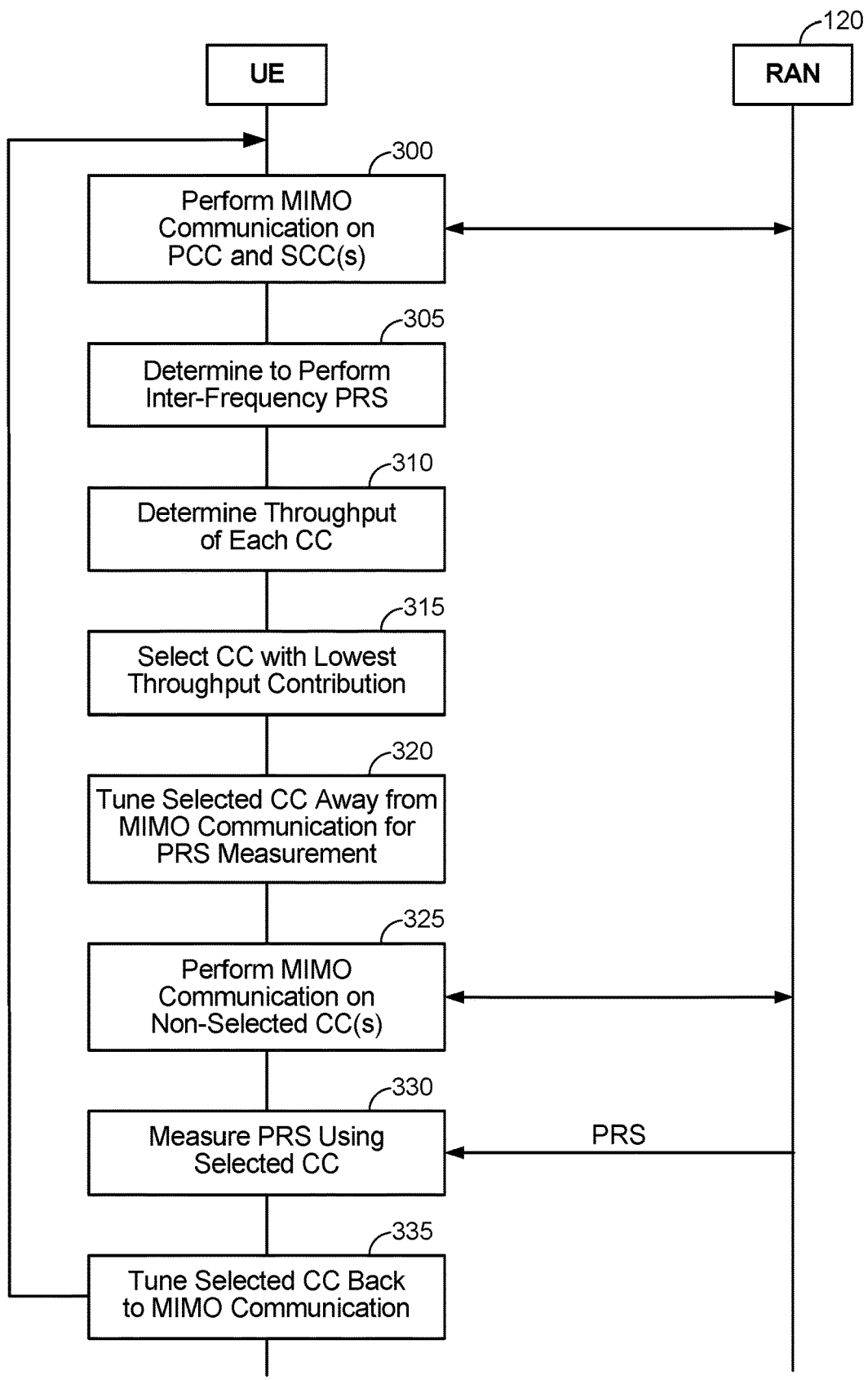
FIG. 3 illustrates a process of performing an inter-frequency Positioning Reference Signal (PRS) measurement.

FIG. 3 illustrates a process of performing an inter-frequency PRS measurement. Referring to FIG. 3, assume that a given UE has established a PCC and one or more SCCs with respective cells of the RAN 120. At block 300, the UE performs MIMO communication on the PCC and the one or more SCCs. At block 305, the given UE determines to perform an inter-frequency PRS measurement. At block 310, the given UE determines the throughput of each active CC (e.g., the PCC and the one or more SCCs). At block 315, the given UE selects the CC (e.g., PCC or SCC) with the lowest throughput contribution for performing the inter-frequency PRS measurement. At block 320, the given UE tunes each receive chain of the selected CC away from the MIMO communication.

Each CC may be characterized via a rank number that indicates the number of receive chains being used or aggregated by that CC. The number of transmit chains may be the same as or different than the number of receive chains. The rank number for a particular CC may be reported to the RAN 120 as a Rank Indicator (RI). So, 4×4 characterizes a CC with 4 transmit chains and 4 receive chains (rank number or RI=4), 1×4 characterizes a CC with 1 transmit chain and 4 receive chains (rank number or RI=4), 2×2 characterizes a CC with 2 transmit chains and 2 receive chains (rank number or RI=2), and so on. By tuning away the receive chains of the selected CC away from the MIMO communication at block 320, the given UE may report RI=0 to the RAN 120 (e.g., so a cell associated with the selected CC does not attempt to transmit to the given UE while the selected CC is tuned away from the MIMO communication).

At block 325, each non-selected CC continues to perform MIMO communication as in block 300, while at block 330, the selected CC performs the inter-frequency PRS measurement. At block 335, the given UE tunes the selected CC back to the MIMO communication, and the process returns to block 300. By tuning the receive chains of the selected CC back to the MIMO communication at block 335, the given UE may report its target RI (e.g., RI=4) to the RAN 120 (e.g., RI=0 no longer reported). As will be appreciated, the tuning away of each receive chain of the selected CC away from the MIMO communication causes a measurement gap on the selected CC.

With respect to FIG. 3, consider an example whereby the given UE is performing MIMO communication at block 300 on a PCC, SCC1 and SCC2 with the following relative throughput contributions:

TABLE 1

"Aggregate" Throughput Contributions of Component Carriers Before Inter-Frequency PRS Measurement

| Component Carrier | Mode | "Aggregate" CC Throughput Contribution |
| --- | --- | --- |
| PCC | 4 × 4 Spatial Multiplexing Mode | 45% |
| SCC1 | 4 × 4 Spatial Multiplexing Mode | 25% |
| SCC2 | 4 × 4 Spatial Multiplexing Mode | 30% |

Operation in Spatial Multiplexing Mode indicates that each respective transmit chain and receive chain is being used to exchange different data, in contrast to Spatial Diversity Mode. Under these assumptions, the given UE in accordance with the process depicted in FIG. 3 would select SCC1 as the selected CC to be tuned away for the inter-frequency PRS measurement because SCC1 has the lowest throughput contribution.

Figure 4:
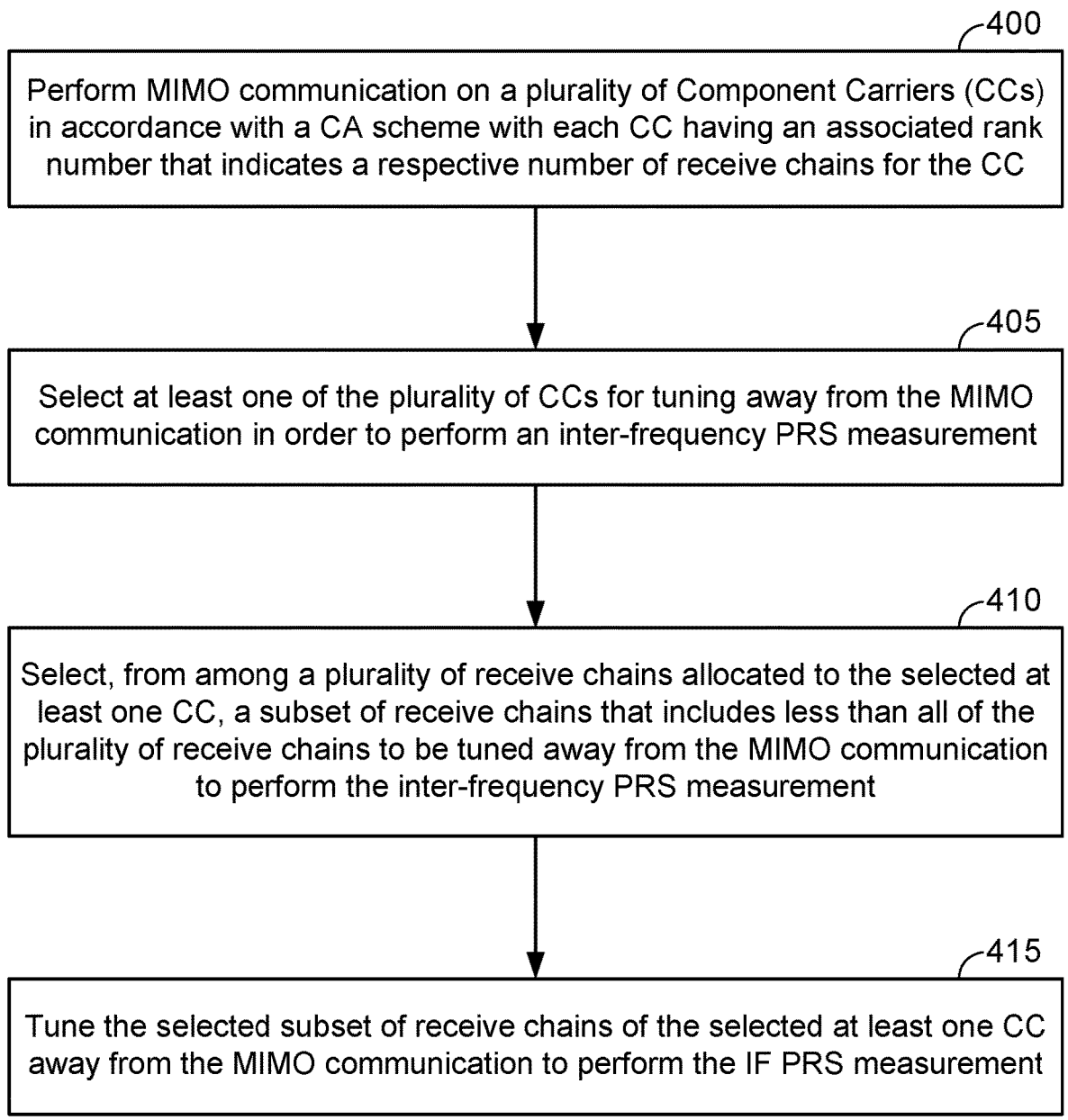
FIG. 4 illustrates a process of performing an inter-frequency PRS measurement whereby less than all receive chains of a component carrier (CC) are tuned away from MIMO communication to perform an inter-frequency PRS measurement in accordance with an embodiment of the disclosure.

FIG. 4 illustrates a process of performing an inter-frequency PRS measurement whereby less than all receive chains of a CC are tuned away from MIMO communication to perform an inter-frequency PRS measurement in accordance with an embodiment of the disclosure.

Referring to FIG. 4, at block 400, a given UE performs MIMO communication on a plurality of CCs in accordance with a CA scheme with each CC having an associated rank number (e.g., 2, 4, 8, etc.) that indicates a respective number of receive chains for the CC. Means for performing the functionality of block 400 can include, but are not limited to, any combination of processor(s) 205, memory 210, instructions instructing the processor(s) 205 to perform the functionality of block 400 saved in memory 210, wireless communications interface 230, and bus 235 of FIG. 2. At block 405, the given UE selects at least one of the plurality of CCs for tuning away from the MIMO communication in order to perform an inter-frequency PRS measurement. In an example, the selection of the CC(s) at block 405 may be implemented similarly to block 310 in at least one embodiment, such that the CC with the lowest aggregate throughput contribution is selected. Alternatively, the selection of the CC(s) at block 405 may be implemented in accordance with any other CC selection scheme, such as the CC selection schemes described below with respect to other embodiments of the disclosure (e.g., CC selection based on per-rank throughput contribution of the CCs, a transmission mode of the CCs, a channel quality of the CCs, a combination thereof, etc.). Means for performing the functionality of block 405 can include, but are not limited to, any combination of processor(s) 205, memory 210, instructions instructing the processor(s) 205 to perform the functionality of block 405 saved in memory 210, and bus 235 of FIG. 2.

Referring to FIG. 4, at block 410, the given UE selects, from among a plurality of receive chains allocated to the selected at least one CC, a subset of receive chains that includes less than all of the plurality of receive chains to be tuned away from the MIMO communication to perform the inter-frequency PRS measurement. For example, if one of the selected CC(s) has a rank number of 4 (e.g., 4×4) indicating 4 receive chains, the selected subset of received chains may include 2 receive chains, leaving the CC with 2 remaining receive chains (e.g., 2×2).

Referring to block 410 of FIG. 4, in addition to identifying the correct number of receive chains (e.g., 1, 2, 3, etc.) to be tuned away from the MIMO communication to perform the inter-frequency PRS measurement, in one embodiment, one or more selection criteria may be used to select particular receive chains over other receive chains to be part of the selected subset of receive chains. For example, variations in channel quality may occur between respective receive chains of the same CC due to reasons such as UE orientation, angle-of-arrival (AOA) of signals from a base station, whether a user is holding the UE in his/her hand, and so on. In an example, at block 410, a channel quality may be determined or calculated for each receive chain of a selected CC, and one or more receive chains with the lowest determined or calculated channel quality may be designated or selected to be tuned away from the MIMO communication to perform the inter-frequency PRS measurement. In an example, the determined channel quality may include a transport block size used on each receive chain (e.g., the receive chain(s) with the lowest transport block size are selected to be tuned away from the MIMO communication to perform the inter-frequency PRS measurement). In another example, the determined channel quality may include a signal-to-noise ratio (SNR) on each receive chain (e.g., the receive chain(s) with the lowest SNR are selected to be tuned away from the MIMO communication to perform the inter-frequency PRS measurement). Alternatively, a combination of transport block size and SNR and/or other channel quality metric(s) may be evaluated to select the subset of receive chains.

Still referring to block 410 of FIG. 4, in a further example, the one or more selection criteria for making receive chain selections may include chain-specific sensitivity (or performance) of the plurality of receive chains for a target PRS frequency (i.e., a frequency on which the PRS is transmitted). For example, the plurality of receive chains may be ranked with respect to the target PRS frequency based on sensitivity or performance of the respective receive chains for the target PRS frequency, with top-ranked receive chain(s) (e.g., the receive chain(s) with the highest chain-specific sensitivity) being selected at block 410 to be part of the subset of receive chains. In a further example, the one or more selection criteria includes chain-specific historical PRS measurement performance. For example, the results of previous IF PRS measurements may be evaluated, and one or more receive chains with poor chain-specific historical PRS measurement performance may be excluded from selection at block 410. Means for performing the functionality of block 410 can include, but are not limited to, any combination of processor(s) 205, memory 210, instructions instructing the processor(s) 205 to perform the functionality of block 410 saved in memory 210, and bus 235 of FIG. 2.

At block 415, the given UE tunes the selected subset of receive chains of the selected at least one CC away from the MIMO communication to perform the inter-frequency PRS measurement. While not illustrated expressly in FIG. 4, during block 415, the given UE may maintain any non-selected receive chains of the selected at least one CC that are not made part of the selected subset of receive chains tuned to the MIMO communication. So, in an example, if the selected at least one CC is operating in accordance with Spatial Diversity Mode and the channel quality on the selected at least one CC is above a channel quality threshold, a measurement gap can be avoided during the tuning of block 415 by virtue of the non-selected receive chains remaining tuned to the MIMO communication during the inter-frequency PRS measurement (e.g., in contrast to FIG. 3 where all receive chains of a selected CC are tuned away for the inter-frequency PRS measurement). Means for performing the functionality of block 415 can include, but are not limited to, any combination of processor(s) 205, memory 210, instructions instructing the processor(s) 205 to perform the functionality of block 415 saved in memory 210, wireless communications interface 230, and bus 235 of FIG. 2.

Referring to FIG. 4, the subset of receive chains may be selected at block 410 in accordance with one or more receive chain selection criteria. For example, the one or more receive chain selection criteria may include channel quality associated with the selected at least one CC. In a specific example, assume that the selected at least one CC includes an SCC operating in 4×4 Spatial Diversity Mode, and that a channel quality associated with the SCC is above a channel quality threshold. In this case, the SCC can drop some of its receive chains while still providing adequate performance (e.g., sufficient to avoid a measurement gap using residual or non-selected receive chains), such that the SCC may drop two of its receive chains and thereby downgrade to 2×2 Spatial Diversity Mode. The two dropped receive chains may be selected to be part of the selected subset of receive chains at block 410 for performance of the inter-frequency PRS measurement at block 415. After performing the inter-frequency PRS measurement, the two dropped receive chains may be returned to the SCC which, at that point, resumes operation in in 4×4 Spatial Diversity Mode. Moreover, it is possible that multiple CCs are selected at block 410. In this case, it is possible that more than one of the multiple CCs will undergo a "partial" receive chain re-allocated for the inter-frequency PRS measurement (e.g., PCC and SCC1 drop from 4×4 to 2×2, SCCs 1 and 2 drop from 8×8 to 4×4, etc.).

Figure 5:
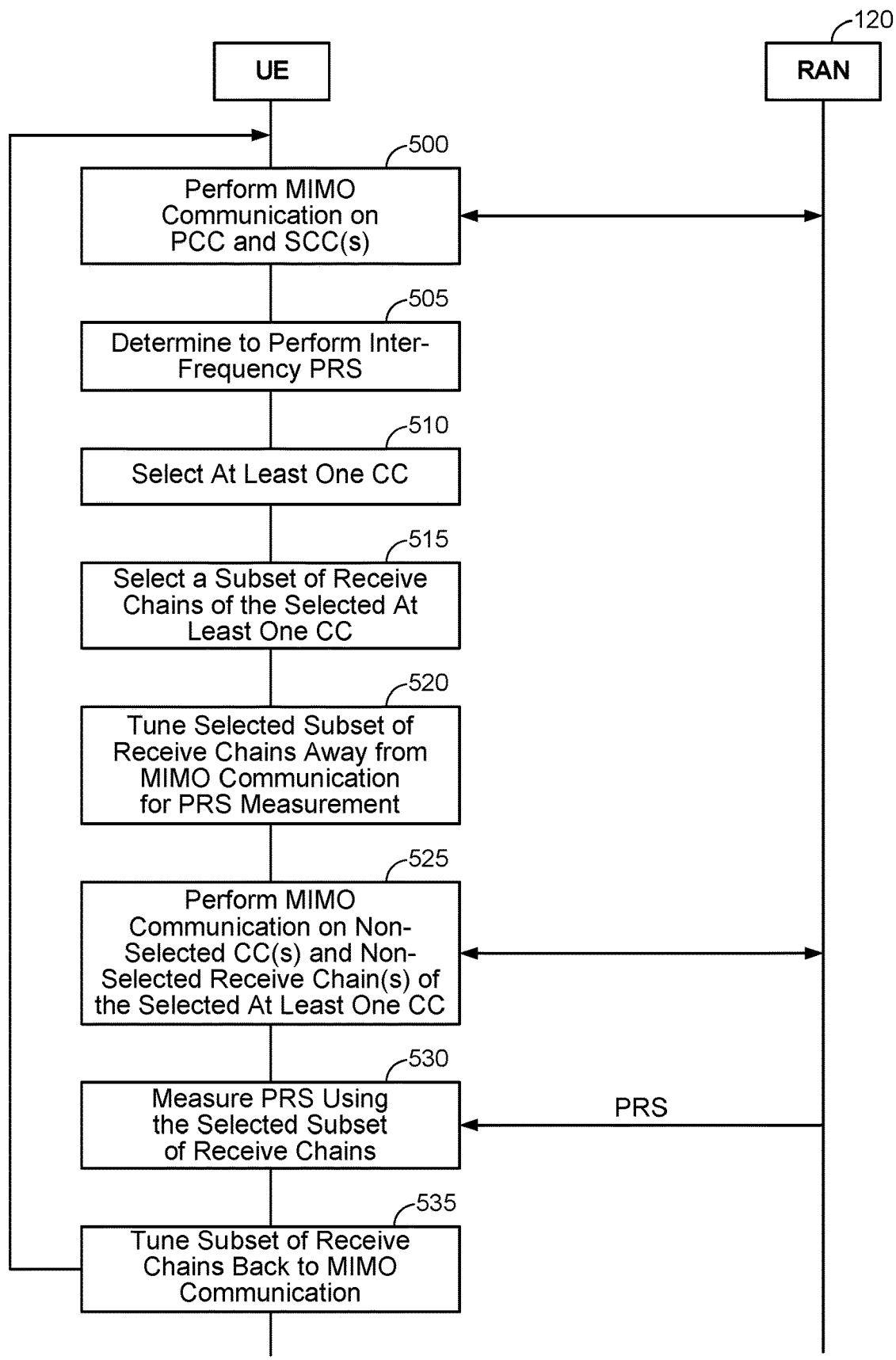
FIG. 5 illustrates an example implementation of the process of FIG. 4 in accordance with an embodiment of the disclosure.

FIG. 5 illustrates an example implementation of the process of FIG. 4 in accordance with an embodiment of the disclosure. Referring to FIG. 5, assume that a given UE has established a PCC and one or more SCCs with respective cells of the RAN 120. At block 500 (e.g., as in block 400 of FIG. 4), the UE performs MIMO communication on the PCC and the one or more SCCs. At block 505, the given UE determines to perform an inter-frequency PRS measurement. At block 510 (e.g., as in block 405 of FIG. 4), the given UE selects at least one CC (e.g., PCC or SCC) for performing the inter-frequency PRS measurement. At block 515 (e.g., as in block 410 of FIG. 4), the given UE selects a subset of receive chains of the selected at least one CC for performing the inter-frequency PRS measurement. At block 520 (e.g., as in block 415 of FIG. 4), the given UE tunes each receive chain of the selected subset of receive chains of the selected at least one CC away from the MIMO communication. So, in contrast to block 320 of FIG. 3, some receive chains from the selected at least one CC remain tuned to the MIMO communication during the inter-frequency PRS measurement.

Referring to FIG. 5, by tuning away the receive chains of the at least one selected CC away from the MIMO communication at block 520, the given UE may report a lower rank number (e.g., lower than a rank number reported before the receive chains are tuned away from the MIMO communication), or, for example, an indication of at least one rank number for the selected CC that is lowered, to the RAN 120 (e.g., so a cell associated with the selected at least one CC does not attempt to transmit to the given UE on all receive chains while the selected at least one CC is tuned away from the MIMO communication), based on the tuning away from the MIMO communication of the at least one CC. For example, if a particular CC among the selected at least one CC is operating in 4×4 prior to block 520 (e.g., RI=4) and drops to 2×2, the particular CC may report RI=2 during the inter-frequency PRS measurement. Moreover, if multiple CCs each lose at least one receive chain due to the tuning away at block 520, then the given UE may report the respective lower rank numbers (or indications of the respective lower rank numbers) for each of the multiple CCs.

At block 525, each non-selected CC and each non-selected receive chain among the selected at least one CC continue to perform MIMO communication as in block 500, while at block 530, the selected subset of receive chains of the selected at least one CC performs the inter-frequency PRS measurement. At block 535, the given UE tunes the selected subset of receive chains of the selected at least one CC back to the MIMO communication, and the process returns to block 500. By tuning the selected subset of receive chains of the selected at least one CC back to the MIMO communication at block 535, the given UE may report its target RI to the RAN 120 (e.g., RI=4 is reported again instead of RI=2 for a particular CC, etc.). As will be appreciated, the tuning of each receive chain of the selected CC away from the MIMO communication causes a measurement gap on the selected CC.

Generally, when a plurality of CCs are active for the given UE, the plurality of CCs may be categorized into one of the following CC configurations:

TABLE 2

CC Configurations

| CC Configuration # | CC Configuration Description |
| --- | --- |
| 1 | Each CC operates in Spatial Diversity Mode ("Spatial Diversity + Spatial Diversity") |
| 2 | One or more CCs operate in Spatial Diversity Mode while one or more other CCs operate in Spatial Multiplexing Mode ("Spatial Diversity + Spatial Multiplexing") |
| 3 | Each CC operates in Spatial Multiplexing Mode and each CC has the same rank number equal to 2 ("Spatial Multiplexing + Spatial Multiplexing with Equal Rank and Rank = 2") |
| 4 | Each CC operates in Spatial Multiplexing Mode and each CC has the same rank number that is greater than 2 ("Spatial Multiplexing + Spatial Multiplexing with Equal Rank and Rank > 2") |
| 5 | Each CC operates in Spatial Multiplexing Mode and two or more of the CCs have different rank numbers ("Spatial Multiplexing + Spatial Multiplexing with Unequal Rank") |

With respect to FIG. 5, consider an example of CC Configuration #4 whereby the given UE is performing MIMO communication at block 500 on a PCC, SCC1 and SCC2 with the following relative throughput contributions:

TABLE 3

Modes of Component Carriers Before Inter-Frequency PRS Measurement

| Component Carrier | Mode |
| --- | --- |
| PCC | 4 × 4 Spatial Multiplexing Mode |
| SCC1 | 4 × 4 Spatial Multiplexing Mode |
| SCC2 | 4 × 4 Spatial Multiplexing Mode |

In an example, under the assumptions shown above, if SCC1 is the selected at least one CC at block 510 and 2 receive chains are selected as the subset of receive chains at block 515, the given UE may report RI=2 for SCC1 during the inter-frequency PRS measurement with MIMO communication being performed at block 525 as follows:

TABLE 4

Modes of Component Carriers During Inter-Frequency PRS Measurement Based on Partial Tune-Away of SCC1 Receive Chains

| Component Carrier | Mode |
| --- | --- |
| PCC | 4 × 4 Spatial Multiplexing Mode |
| SCC1 | 2 × 2 Spatial Multiplexing Mode |
| SCC2 | 4 × 4 Spatial Multiplexing Mode |

In another example, under the assumptions shown above, if SCC1 and SCC2 are selected as the selected at least one CC at block 510 and 2 receive chains are selected from each of SCC1 and SCC2 as the subset of receive chains at block 515, the given UE may report RI=2 for SCC1 and SCC2 during the inter-frequency PRS measurement with MIMO communication being performed at block 525 as follows:

TABLE 5

Modes of Component Carriers During Inter-
Frequency PRS Measurement Based on Partial
Tune-Away of SCC1 and SCC2 Receive Chains

| Component Carrier | Mode |
|---|---|
| PCC | 4 × 4 Spatial Multiplexing Mode |
| SCC1 | 2 × 2 Spatial Multiplexing Mode |
| SCC2 | 2 × 2 Spatial Multiplexing Mode |

With respect to FIG. 5, consider an example of CC Configuration #3 whereby the given UE is performing MIMO communication at block 500 on a PCC, SCC1 and SCC2 with the following relative throughput contributions:

TABLE 6

Modes of Component Carriers Before
Inter-Frequency PRS Measurement

| Component Carrier | Mode |
|---|---|
| PCC | 2 × 2 Spatial Multiplexing Mode |
| SCC1 | 2 × 2 Spatial Multiplexing Mode |
| SCC2 | 2 × 2 Spatial Multiplexing Mode |

In an example, under the assumptions shown above, SCC1 and SSC2 may be selected for partial receive chain re-allocation despite operating in 2×2 Spatial Multiplexing Mode (e.g., 1 receive chain taken away from each). Even if dropping to 1×1 Spatial Multiplexing Mode reduces performance, the overhead associated with completely dropping a CC (e.g., RI=0) may be reduced by maintaining each selected CC with a single receive chain (e.g., RI=1), especially if the receive chain(s) are designated to be tuned away for a long duration. In this case, the given UE may report RI=1 for SCC1 and SCC2 during the inter-frequency PRS measurement with MIMO communication being performed at block 525 as follows:

TABLE 7

Modes of Component Carriers During Inter-
Frequency PRS Measurement Based on Partial
Tune-Away of SCC1 and SCC2 Receive Chains

| Component Carrier | Mode |
|---|---|
| PCC | 2 × 2 Spatial Multiplexing Mode |
| SCC1 | 1 × 1 Spatial Multiplexing Mode |
| SCC2 | 1 × 1 Spatial Multiplexing Mode |

While the above-noted is based on CC Configurations #3 and #4, it will be appreciated that the processes of FIGS. 4-5 may be applied with respect to any of CC Configurations #1 through #5.

While FIGS. 4-5 relate to various ways in which a CC selected for performing an inter-frequency PRS measurement may tune away less than all of its receive chains, other embodiments of the disclosure are related to various methodologies for selecting the CC. In particular, FIG. 3 selects the CC to be tuned away for the inter-frequency PRS measurement specifically based upon the relative aggregate throughput contributions by the various CCs, whereas embodiments of the disclosure to be described below in more detail select the CC(s) for the inter-frequency PRS measurement based on one or more other factors, including per-rank throughput contribution of each CC (e.g., instead of an aggregated throughput contribution of each CC as in FIG. 3), a transmission mode (e.g., TM1-TM9, Spatial Diversity Mode, Spatial Multiplexing Mode, etc.) of the selected CC(s), a channel quality of the selected CC(s) or a combination thereof.

Figure 6:
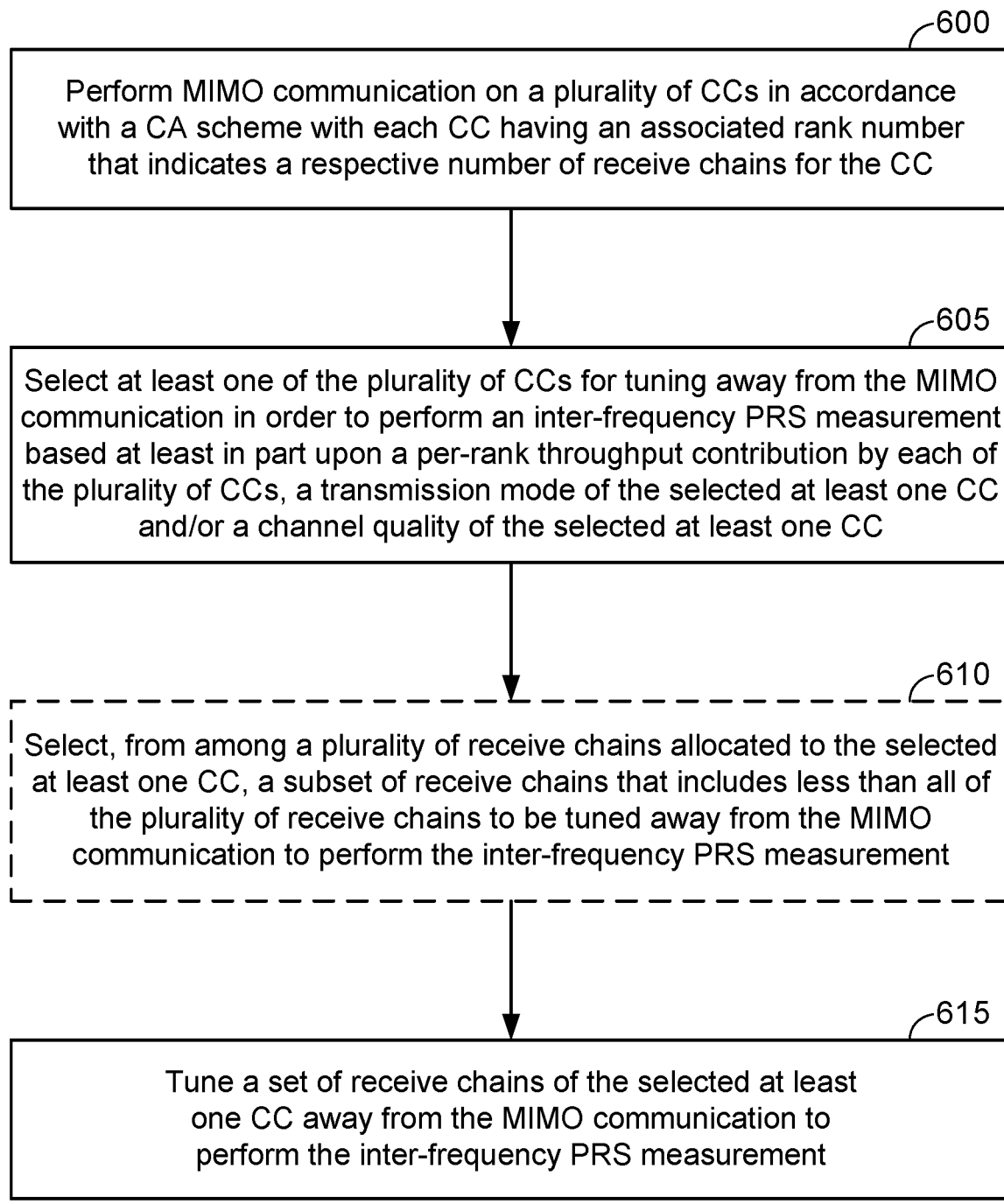
FIG. 6 illustrates a process of performing an inter-frequency PRS measurement in accordance with an embodiment of the disclosure.

FIG. 6 illustrates a process of performing an inter-frequency PRS measurement in accordance with an embodiment of the disclosure. The process of FIG. 6 may be performed in conjunction with the process of FIG. 4 (e.g., less than all receive chains of a selected CC are tuned away for inter-frequency PRS measurement), or alternatively may be performed separately from the process of FIG. 4.

Referring to FIG. 6, at block 600, a given UE performs MIMO communication on a plurality of CCs in accordance with a CA scheme with each CC having an associated rank number that indicates a respective number of receive chains for the CC. Means for performing the functionality of block 600 can include, but are not limited to, any combination of processor(s) 205, memory 210, instructions instructing the processor(s) 205 to perform the functionality of block 600 saved in memory 210, wireless communications interface 230, and bus 235 of FIG. 2. At block 605, the given UE selects at least one of the plurality of CCs for tuning away from the MIMO communication in order to perform an PRS measurement based at least in part upon a per-rank throughput contribution by each of the plurality of CCs, a transmission mode of the selected at least one CC and/or a channel quality of the selected at least one CC. Means for performing the functionality of block 605 can include, but are not limited to, any combination of processor(s) 205, memory 210, instructions instructing the processor(s) 205 to perform the functionality of block 605 saved in memory 210, and bus 235 of FIG. 2. At block 610, the given UE optionally selects, from among a plurality of receive chains allocated to the selected at least one CC, a subset of receive chains that includes less than all of the plurality of receive chains to be tuned away from the MIMO communication to perform the inter-frequency PRS measurement. Block 610 is optional because, as an alternative, all receive chains for the selected at least one CC may be tuned away to perform the inter-frequency PRS measurement. Means for performing the functionality of block 610 can include, but are not limited to, any combination of processor(s) 205, memory 210, instructions instructing the processor(s) 205 to perform the functionality of block 610 saved in memory 210, and bus 235 of FIG. 2. At block 615, the given UE tunes a set of receive chains of the selected at least one CC away from the MIMO communication to perform the inter-frequency PRS measurement. In an example, if optional block 610 is performed, then the set of receive chains tuned away from the MIMO communication at block 615 corresponds to the selected subset of receive chains from block 610. In an example, optional block 610 may include a selection of particular receive chains based on their associated chain-specific channel quality levels as described above with respect to block 410 of FIG. 4. Means for performing the functionality of block 615 can include, but are not limited to, any combination of processor(s) 205, memory 210, instructions instructing the processor(s) 205 to perform the functionality of block 610 saved in memory 210, wireless communications interface 230, and bus 235 of FIG. 2.

Figure 7:
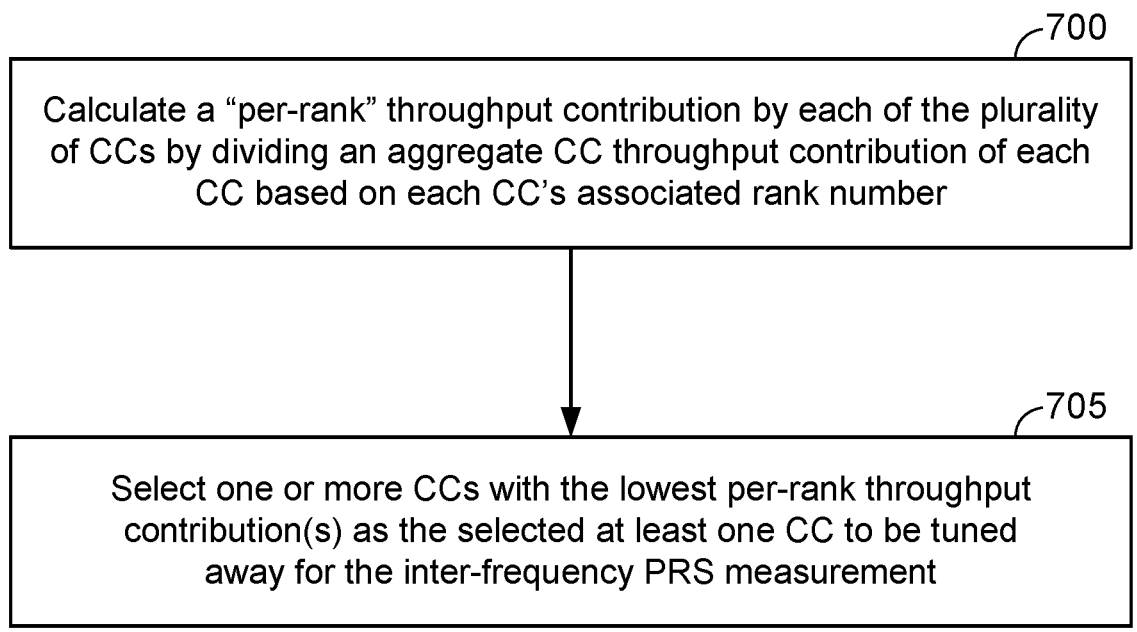
FIG. 7 illustrates an example implementation of a portion of FIG. 6 in accordance with an embodiment of the disclosure.

FIG. 7 illustrates an example implementation of block 605 of FIG. 6 in accordance with an embodiment of the disclosure. Referring to FIG. 7, assume that the given UE engaged in operation with CC Configuration #5 (e.g., Spatial Multiplexing+Spatial Multiplexing with Unequal Rank), as follows:

TABLE 8

"Aggregate" Throughput Contributions of Component Carriers Before Inter-Frequency PRS Measurement

| Component Carrier | Mode | "Aggregate" CC Throughput Contribution |
| --- | --- | --- |
| PCC | 2 × 2 Spatial Multiplexing Mode | 45% |
| SCC1 | 4 × 4 Spatial Multiplexing Mode | 25% |
| SCC2 | 8 × 8 Spatial Multiplexing Mode | 30% |

In accordance with FIG. 3, the given UE would simply select SCC1 because SCC1, in aggregate, has the lowest throughput contribution relative to PCC and SCC2. However, at block 700, the "per-rank" throughput contribution by each of the plurality of CCs is calculated by dividing the aggregate CC throughput contribution of each CC based on each CC's associated rank number, which, in some examples, may be different such that two or more of the plurality of CCs have different rank numbers. In an example where the rank number itself is used to divide each CC's aggregate CC throughput contribution, the rank number of PCC in 2×2 is 2, such that the 45% throughput contribution is divided by 2 to result in a per-rank throughput contribution of PCC being equal to 22.5%. Using this algorithm, the per-rank throughput contributions of PCC, SCC1 and SCC2 are as follows:

TABLE 9

"Per-Rank" Throughput Contributions of Component Carriers Before Inter-Frequency PRS Measurement

| Component Carrier | Mode | "Per-Rank" Throughput Contribution |
| --- | --- | --- |
| PCC | 2 × 2 Spatial Multiplexing Mode | 45%/2 = 22.5% |
| SCC1 | 4 × 4 Spatial Multiplexing Mode | 25%/4 = 6.25% |
| SCC2 | 8 × 8 Spatial Multiplexing Mode | 30%/8 = 3.75% |

At block 705, the given UE selects one or more CCs with the lowest per-rank throughput contribution as the selected at least one CC to be tuned away (at least in part) for the inter-frequency PRS measurement, instead of the CC with the lowest aggregate throughput contribution as in FIG. 3. Accordingly, under the assumptions above, further assume that SSC2 is selected as the selected at least one CC to be tuned away for the inter-frequency PRS measurement. In a further example, a subset of receive chains (e.g., 2 receive chains) may be selected from SCC2 in accordance with optional block 610, and the given UE may report a reduced RI (e.g., RI=6) for SCC2 during the inter-frequency PRS measurement, as follows:

TABLE 10

Modes of Component Carriers During Inter-Frequency PRS Measurement Based on SCC2 Being Selected for Partial Receive Chain Tune-Away Using "Per-Rank" Throughput Contributions

| Component Carrier | Mode |
| --- | --- |
| PCC | 2 × 2 Spatial Multiplexing Mode |
| SCC1 | 4 × 4 Spatial Multiplexing Mode |
| SCC2 | 6 × 6 Spatial Multiplexing Mode |

In an alternative example, at block 705, the given UE may select both SCC1 and SCC2 based on these CCs having the two lowest per-rank throughput contributions among the CCs to be tuned away (at least in part) for the inter-frequency PRS measurement, instead of only selecting a single CC. Accordingly, under the assumptions above, further assume that both SCC1 and SSC2 are selected as the selected at least one CC to be tuned away for the inter-frequency PRS measurement. In a further example, a subset of receive chains (e.g., 2 receive chains) may be selected from SCC1 and SCC2 in accordance with optional block 610, and the given UE may report reduced RIs for SCC1 and SCC2 (e.g., RI=2 for SCC1 and RI=6 for SCC2) during the inter-frequency PRS measurement, as follows:

TABLE 11

Modes of Component Carriers During Inter-Frequency PRS Measurement Based on SCC1 and SCC2 Both Being Selected for Partial Receive Chain Tune-Away Using "Per-Rank" Throughput Contributions

| Component Carrier | Mode |
| --- | --- |
| PCC | 2 × 2 Spatial Multiplexing Mode |
| SCC1 | 2 × 2 Spatial Multiplexing Mode |
| SCC2 | 6 × 6 Spatial Multiplexing Mode |

In another example, the per-rank throughput contribution may be calculated at block 700 by dividing the aggregated throughput contributions of the CCs using some other number rather than the rank number itself (e.g., if the rank numbers of all CCs are multiples of 2, than aggregated throughput contributions may be divided by half of each CC's respective rank number, which would result in PCC having a per-rank throughput contribution of 45%, SCC1 having a per-rank throughput contribution 12.5% and SCC2 having a "per-rank" throughput contribution of 7.5%). As will be appreciated, the manner in which the aggregated throughput contributions are scaled to achieve the per-rank throughput contribution is somewhat arbitrary in the sense that the ranking of the per-rank throughput contributions among the CCs is unchanged.

Figure 8:
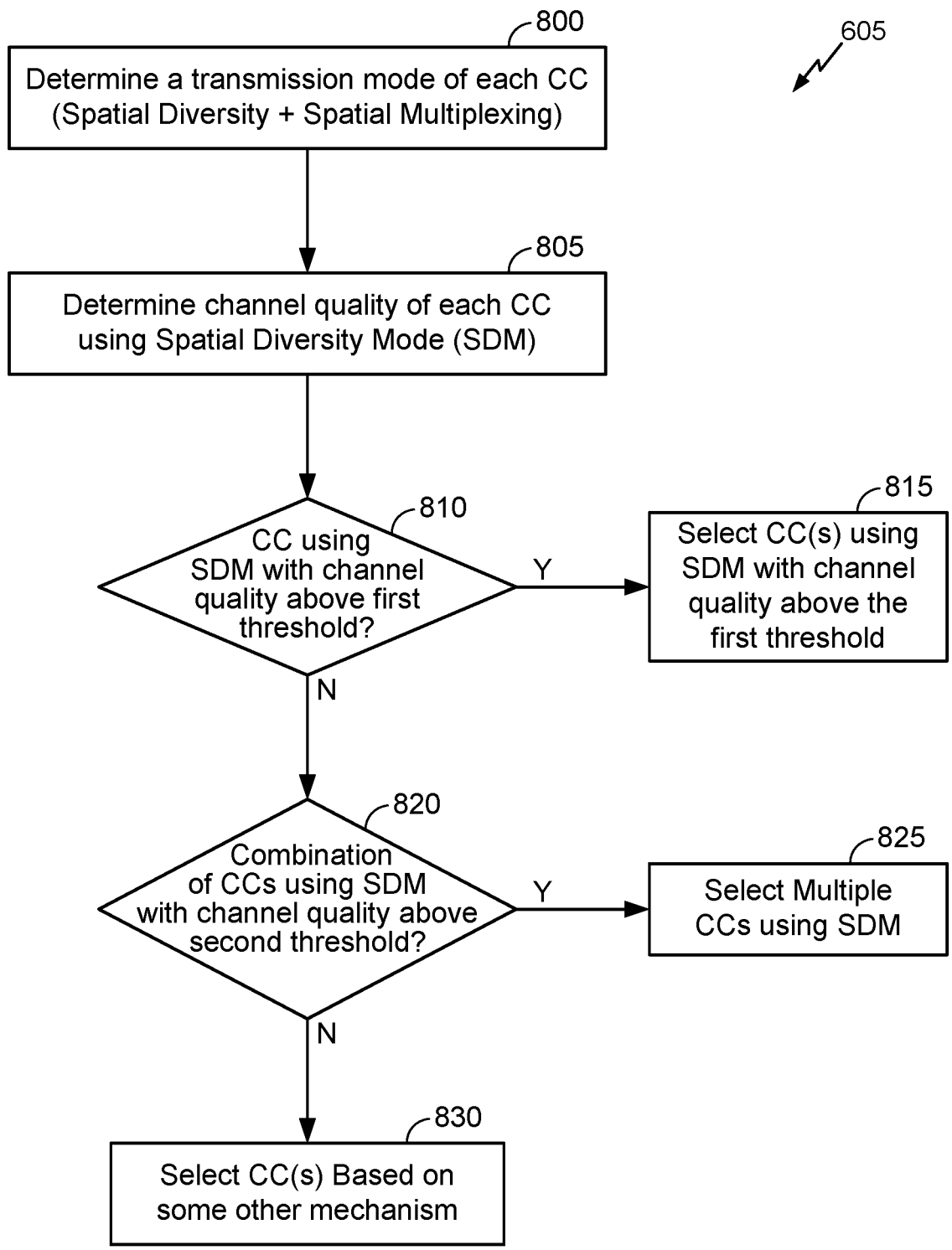
FIG. 8 illustrates an example implementation of a portion of FIG. 6 in accordance with another embodiment of the disclosure.

FIG. 8 illustrates an example implementation of block 605 of FIG. 6 in accordance with another embodiment of the disclosure. Referring to FIG. 7, assume that the given UE engaged in operation with CC Configuration #2 (e.g., Spatial Diversity+Spatial Multiplexing), as follows:

TABLE 12

"Aggregate" Throughput Contributions of Component
Carriers Before Inter-Frequency PRS Measurement

| Component Carrier | Mode | "Aggregate" CC Throughput Contribution |
|---|---|---|
| PCC | 2 × 2 Spatial Multiplexing Mode | 40% |
| SCC1 | 1 × 4 Spatial Diversity Mode | 30% |
| SCC2 | 1 × 4 Spatial Diversity Mode | 30% |

In accordance with FIG. 3, the given UE would simply select SCC1 or SCC2 (i.e., arbitrarily) because SCC1 and SCC2, in aggregate, are tied for the lowest throughput contribution.

Referring to FIG. 8, at block 800, the given UE determines a transmission mode of each CC, as shown in Table 9. In LTE MIMO, for example, the transmission mode may be determined as being one of TM1-TM9, each of which corresponds to either a Spatial Multiplexing Mode or a Spatial Diversity Mode. At block 805, the given UE determines a channel quality of each CC using Spatial Diversity Mode. In Table 9 for example, SCC1 and SCC2 are using Spatial Diversity Mode. The channel quality may be determined in a variety of ways (e.g., transport block size, signal-to-noise ratio (SNR), etc.). Moreover, as noted above, each receive chain may have a different channel quality due to various factors (e.g., how the user is holding the UE, UE orientation, AOA of signals from a base station, etc.). In this case, the channel quality for a particular CC (e.g., SCC1, SCC2, etc.) may be an average of the receive chain-specific channel qualities measured on each of that particular CC's respective receive chains.

Referring to FIG. 8, at block 810, the given UE determines whether the channel quality of any CC using Spatial Diversity Mode is above a first channel quality threshold. For example, the first channel quality threshold may be set high enough so that a first threshold number of receive chains (e.g., 2 receive chains) may be taken away from the CC without causing the channel quality on the CC to drop below a lower channel quality threshold. In other words, a CC using Spatial Diversity Mode above the first channel quality threshold is expected to be able to provide all the receive chains necessary to perform the inter-frequency PRS measurement without compromising performance on the CC. For example, the first channel quality threshold may be configured such that one or more non-selected receive chains from the selected single CC that remain tuned to the MIMO communication during a PRS measurement are expected to be sufficient to monitor the MIMO communication during the PRS measurement without a measurement gap. If such a CC is detected at block 810, a single CC using Spatial Diversity Mode is selected at block 815. Receive chain(s) from the selected single CC are then used to perform the inter-frequency PRS measurement, after which the freed receive chain(s) are returned to the selected single CC. In a further example, if multiple CCs using Spatial Diversity Mode are detected above the first channel quality threshold at block 810, the given UE may select the CC with the highest channel quality and/or the lowest aggregate or per-rank throughput contribution, or the given UE may select each CC above the first channel quality threshold (e.g., with receive chains being taken from each selected CC), and so on. In this manner, CCs with both a low throughput contribution and a poor channel quality may be spared from selection, as selecting such CCs for performing the inter-frequency PRS measurement may cause channel deterioration below a nominal threshold and effectively reduce their throughput contribution to 0. Using the example from Table 9 (above), assume that SCC1 is selected as the single CC at block 815 with 2 receive chains being freed (or tuned away) for the inter-frequency PRS measurement, with the given UE reporting a reduced RI (e.g., RI=2) for SCC1 during the inter during the inter-frequency PRS measurement, as follows:

TABLE 13

Modes of Component Carriers During Inter-Frequency PRS
Measurement Based on High SCC1 Channel Quality Causing
SCC1 to Be Selected for Partial Receive Chain Tune-Away

| Component Carrier | Mode |
|---|---|
| PCC | 2 × 2 Spatial Multiplexing Mode |
| SCC1 | 1 × 2 Spatial Diversity Mode |
| SCC2 | 1 × 4 Spatial Diversity Mode |

Referring to FIG. 8, if no CC using Spatial Diversity Mode is determined to have a channel quality above the first threshold at block 810 (e.g., no single CC has sufficient receive chains to handle the inter-frequency PRS measurement without comprising performance on its respective MIMO communication, such as causing a measurement gap), then at block 820, the given UE determines whether there is a combination of CCs using Spatial Diversity Mode having a channel quality above a second channel quality threshold. The second channel quality threshold is set lower than the first second channel quality threshold and is set so that a second threshold number of receive chains (e.g., 1 receive chain) may be taken away from the CC without causing the channel quality on the CC to drop below the lower channel quality threshold. In other words, a CC using Spatial Diversity Mode above the second channel quality threshold is expected to be able to provide at least one receive chain, which, in combination with receive chains from other CCs, may collectively be sufficient to perform the inter-frequency PRS measurement without compromising performance (e.g., causing a measurement gap) on any of the contributing CCs. For example, the second channel quality threshold may be configured such that one or more non-selected receive chains from each of the multiple selected CCs that remain tuned to the MIMO communication during a PRS measurement are expected to be sufficient to monitor the MIMO communication during the PRS measurement without a measurement gap. If a sufficient number of CCs are determined to have a channel quality above the second channel quality threshold at block 820, then multiple CCs using Spatial Diversity Mode are selected to have at least one receive chain tuned away to perform the inter-frequency PRS measurement at block 825. Using the example from Table 9 (above), assume that SCC1 and SCC2 are selected at block 825 with 1 receive chain being freed (or tuned away) for the inter-frequency PRS measurement from each respective SCC, with the given UE reporting a reduced RI (e.g., RI=1) for SCC1 and SCC2 during the inter-frequency PRS measurement, as follows:

TABLE 14

Modes of Component Carriers During Inter-Frequency
PRS Measurement Based on SCC1 and SCC2 Being Selected
for Partial Receive Chain Tune-Away

| Component Carrier | Mode |
|---|---|
| PCC | 2 × 2 Spatial Multiplexing Mode |
| SCC1 | 1 × 3 Spatial Diversity Mode |
| SCC2 | 1 × 3 Spatial Diversity Mode |

Referring to FIG. 8, at block 830, if no combination of CCs using Spatial Diversity Mode has sufficient available receive chains to perform the inter-frequency PRS measurement without a measurement gap (e.g., less than a threshold number of CCs using Spatial Diversity Mode are above the second channel quality threshold at block 820), then at block 830, one or more CC(s) may be selected using some other mechanism. For example, at least one receive chain may be selected from one or more CCs using Spatial Diversity Mode and at least one receive chain may be selected from one or more CCs using Spatial Multiplexing Mode. So, in one example, at least one CC configured for operation in accordance with the Spatial Multiplexing Mode is included among multiple CCs for tuning away to perform a PRS measurement in response to the CC(s) configured for operation in accordance with the Spatial Diversity Mode having a channel quality below a channel quality threshold (e.g., the first and/or second channel quality thresholds, as noted above). Using the example from Table 9 (above), assume that SCC1 and PCC are selected at block 830 with 1 receive chain being freed (or tuned away) for the inter-frequency PRS measurement from each respective CC, with the given UE reporting a reduced RI (e.g., RI=1) for SCC1 and PCC during the inter-frequency PRS measurement, as follows:

TABLE 15

Modes of Component Carriers During Inter-Frequency
PRS Measurement Based on SCC1 and PCC Being Selected
for Partial Receive Chain Tune-Away

| Component Carrier | Mode |
|---|---|
| PCC | 1 × 1 Spatial Multiplexing Mode |
| SCC1 | 1 × 3 Spatial Diversity Mode |
| SCC2 | 1 × 4 Spatial Diversity Mode |

Referring to FIG. 8 at block 830, in a further example, aggregate CC throughput and/or per-rank throughput may be used as described above.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a DSP, an ASIC, a field-programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium that contains instructions to perform the functions. Computer-readable media includes both computer storage media and communication media including any medium that facilitates transfer of a computer program from one place to another. A storage media may be any available media that can be accessed by a computer. By way of example, and not limitation, such computer-readable media can comprise non-transitory storage media such as RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the disclosure, it should be noted that various changes and modifications could be made herein without departing from the scope of the disclosure as defined by the appended claims. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated.

What is claimed is:

1. A method of operating a user equipment (UE), comprising:
    performing multiple-input multiple-output (MIMO) communication on a plurality of Component Carriers (CCs) in accordance with a Carrier Aggregation (CA) scheme with each CC having an associated rank number that indicates a respective number of receive chains for the CC;
    selecting one of the plurality of CCs for tuning away from the MIMO communication in order to perform an inter-frequency Positioning Reference Signal (PRS) measurement, wherein a plurality of receive chains is allocated to the selected CC;
    determining that the selected CC is configured for operation in accordance with a spatial diversity mode and has a channel quality above a channel quality threshold;
    determining that one or more non-selected receive chains from the selected CC are sufficient to monitor the MIMO communication during the tuning away without a measurement gap;
    selecting, from among the plurality of receive chains allocated to the selected CC, a subset of receive chains that includes less than all of the plurality of receive chains to be tuned away from the MIMO communication to perform the inter-frequency PRS measurement, wherein the selecting of the subset of receive chains is based on the determination that the one or more non-selected receive chains from the selected CC are sufficient to monitor the MIMO communication during the tuning away without the measurement gap; and
    tuning the selected subset of receive chains of the selected CC away from the MIMO communication to perform the inter-frequency PRS measurement while a remaining one or more receive chains of the plurality of receive chains remain tuned to the MIMO communication.

2. The method of claim 1, wherein the selecting the CC is based at least in part upon an aggregate throughput contribution by each of the plurality of CCs, a per-rank throughput contribution by each of the plurality of CCs, a transmission mode of the selected CC, a channel quality of the selected CC, or a combination thereof.

3. The method of claim 1, wherein the selected CC is a first CC, the method further comprising selecting multiple CCs of the plurality of CCs for tuning away from the MIMO communication in order to perform the inter-frequency PRS measurement, wherein the multiple CCs comprises the first CC and at least one additional CC.

4. The method of claim 3, wherein the selected subset of receive chains includes at least one receive chain from each of the multiple CCs.

5. The method of claim 4, further comprising:
    determining that the multiple CCs are each configured for operation in accordance with the spatial diversity mode and each of the multiple CCs has a channel quality above the channel quality threshold,
    wherein the selecting of the subset of receive chains is based on the determining indicating that the one or more non-selected receive chains from each of the multiple CCs are sufficient for each of the multiple CCs to monitor the MIMO communication during the tuning away without the measurement gap.

6. The method of claim 4, wherein the multiple CCs include at least one CC configured for operation in accordance with the spatial diversity mode and at least one CC configured for operation in accordance with a spatial multiplexing mode.

7. The method of claim 6, wherein the at least one CC configured for operation in accordance with the spatial multiplexing mode is included among the multiple CCs in response to the at least one CC configured for operation in accordance with the spatial diversity mode having a channel quality below the channel quality threshold.

8. The method of claim 1, further comprising:
    reporting, to an access network, an indication of at least one rank number for the selected CC that is lowered based on the tuning of the selected subset of receive chains away from the MIMO communication to perform the inter-frequency PRS measurement.

9. The method of claim 8,
    wherein the reporting includes reporting a single lowered rank number for the selected CC, or
    wherein the selected CC is one of multiple CCs selected for tuning away from the MIMO communication in order to perform the inter-frequency PRS measurement, and the reporting includes reporting multiple lowered rank numbers for the multiple CCs.

10. The method of claim 1, wherein the selecting of the subset of receive chains is based on one or more selection criteria.

11. The method of claim 10, further comprising:
    calculating a respective channel quality associated with each of the plurality of receive chains, and
    designating one or more receive chains among the plurality of receive chains with the lowest respective channel quality to be among the selected subset of receive chains.

12. The method of claim 11, wherein the calculating calculates the channel quality associated with each of the plurality of receive chains based on transport block size, signal-to-noise ratio (SNR), or any combination thereof.

13. The method of claim 10,
    wherein the one or more selection criteria includes chain-specific sensitivity of the plurality of receive chains for a target PRS frequency, and
    wherein the selecting of the subset of receive chains selects, from the plurality of receive chains, one or more receive chains with the highest chain-specific sensitivity for the target PRS frequency as the selected subset of receive chains.

14. The method of claim 10, wherein the one or more selection criteria includes chain-specific historical PRS measurement performance.

15. The method of claim 14, wherein one or more receive chains with poor chain-specific historical PRS measurement performance are excluded from selection among the selected subset of receive chains.

16. A user equipment (UE), comprising:
means for performing multiple-input multiple-output (MIMO) communication on a plurality of Component Carriers (CCs) in accordance with a Carrier Aggregation (CA) scheme with each CC having an associated rank number that indicates a respective number of receive chains for the CC;
means for selecting one of the plurality of CCs for tuning away from the MIMO communication in order to perform an inter-frequency Positioning Reference Signal (PRS) measurement;
means for determining that the selected CC is configured for operation in accordance with a spatial diversity mode and has a channel quality above a channel quality threshold;
means for determining that one or more non-selected receive chains from the selected CC are sufficient to monitor the MIMO communication during the tuning away without a measurement gap;
means for selecting, from among a plurality of receive chains allocated to the selected CC, a subset of receive chains that includes less than all of the plurality of receive chains to be tuned away from the MIMO communication to perform the inter-frequency PRS measurement, wherein the means for selecting the subset of receive chains is based on the means for determining indicating that the one or more non-selected receive chains from the selected CC are sufficient to monitor the MIMO communication during the tuning away without the measurement gap; and
means for tuning the selected subset of receive chains of the selected CC away from the MIMO communication to perform the inter-frequency PRS measurement while a remaining one or more receive chains of the plurality of receive chains remain tuned to the MIMO communication.

17. The UE of claim 16, wherein the means for selecting the CC includes means for selecting the CC based at least in part upon an aggregate throughput contribution by each of the plurality of CCs, a per-rank throughput contribution by each of the plurality of CCs, a transmission mode of the selected CC, a channel quality of the selected CC, or a combination thereof.

18. The UE of claim 16,
wherein the selected CC is a first CC, wherein the means for selecting the CC includes means for selecting multiple CCs of the plurality of CCs for tuning away from the MIMO communication in order to perform the inter-frequency PRS measurement, wherein the multiple CCs comprises the first CC and at least one additional CC.

19. A user equipment (UE), comprising:
at least one processor coupled to a transceiver and configured to:
perform multiple-input multiple-output (MIMO) communication on a plurality of Component Carriers (CCs) in accordance with a Carrier Aggregation (CA) scheme with each CC having an associated rank number that indicates a respective number of receive chains for the CC;
select one of the plurality of CCs for tuning away from the MIMO communication in order to perform an inter-frequency Positioning Reference Signal (PRS) measurement;
determine that the selected CC is configured for operation in accordance with a spatial diversity mode and has a channel quality above a channel quality threshold;
determine that one or more non-selected receive chains from the selected CC are sufficient to monitor the MIMO communication during the tuning away without a measurement gap;
selecting, from among a plurality of receive chains allocated to the selected CC, a subset of receive chains that includes less than all of the plurality of receive chains to be tuned away from the MIMO communication to perform the inter-frequency PRS measurement, wherein the selecting of the subset of receive chains is based on the determination that the one or more non-selected receive chains from the selected CC are sufficient to monitor the MIMO communication during the tuning away without the measurement gap; and
tune the selected subset of receive chains of the selected CC away from the MIMO communication to perform the inter-frequency PRS measurement while a remaining one or more receive chains of the plurality of receive chains remain tuned to the MIMO communication.

20. The UE of claim 19, wherein the at least one processor coupled to the transceiver and configured to select the CC includes the at least one processor coupled to the transceiver and configured to select the CC based at least in part upon an aggregate throughput contribution by each of the plurality of CCs, a per-rank throughput contribution by each of the plurality of CCs, a transmission mode of the selected CC, a channel quality of the selected CC, or a combination thereof.

21. The UE of claim 19,
wherein the selected CC is a first CC, wherein the at least one processor configured to select one of the plurality of CCs includes the at least one processor configured to select multiple CCs of the plurality of CCs for tuning away from the MIMO communication in order to perform the inter-frequency PRS measurement, wherein the multiple CCs comprises the first CC and at least one additional CC.

22. A non-transitory computer-readable medium containing instructions stored thereon, which, when executed by a user equipment (UE) instruct the UE to perform operations, the instructions comprising:
at least one instruction configured to cause the UE to perform multiple-input multiple-output (MIMO) communication on a plurality of Component Carriers (CCs) in accordance with a Carrier Aggregation (CA) scheme with each CC having an associated rank number that indicates a respective number of receive chains for the CC;
at least one instruction configured to cause the UE to select one of the plurality of CCs for tuning away from the MIMO communication in order to perform an inter-frequency Positioning Reference Signal (PRS) measurement;
at least one instruction configured to cause the UE to determine that the selected CC is configured for operation in accordance with a spatial diversity mode and has a channel quality above a channel quality threshold;
at least one instruction configured to cause the UE to determine that one or more non-selected receive chains from the selected CC are sufficient to monitor the MIMO communication during the tuning away without a measurement gap;

at least one instruction configured to cause the UE to select, from among a plurality of receive chains allocated to the selected CC, a subset of receive chains that includes less than all of the plurality of receive chains to be tuned away from the MIMO communication to perform the inter-frequency PRS measurement, wherein the selecting of the subset of receive chains is based on the determination that the one or more non-selected receive chains from the selected CC are sufficient to monitor the MIMO communication during the tuning away without the measurement gap; and at least one instruction configured to cause the UE to tune the selected subset of receive chains of the selected CC away from the MIMO communication to perform the inter-frequency PRS measurement while a remaining one or more receive chains of the plurality of receive chains remain tuned to the MIMO communication.

23. The non-transitory computer-readable medium of claim 22, wherein the at least one instruction configured to instruct the UE to select one of the plurality of CCs instructs the UE to select based at least in part upon an aggregate throughput contribution by each of the plurality of CCs, a per-rank throughput contribution by each of the plurality of CCs, a transmission mode of the selected CC, a channel quality of the selected CC, or a combination thereof.

24. The non-transitory computer-readable medium of claim 22, wherein the selected CC is a first CC, wherein the at least one instruction configured to instruct the UE to select one of the plurality of CCs includes the at least one instruction configured to instruct the UE to select multiple CCs of the plurality of CCs for tuning away from the MIMO communication in order to perform the inter-frequency PRS measurement, wherein the multiple CCs comprises the first CC and at least one additional CC.

* * * * *